(12) United States Patent
Wang et al.

(10) Patent No.: US 11,921,530 B2
(45) Date of Patent: Mar. 5, 2024

(54) POWER SUPPLY SYSTEM AND METHOD

(71) Applicant: Delta Electronics, Inc, Taoyuan (TW)

(72) Inventors: Shih-Chung Wang, Taoyuan (TW); Cheng-Yu Shu, Taoyuan (TW); Wei-Chieh Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 6 days.

(21) Appl. No.: 17/383,391

(22) Filed: Jul. 22, 2021

(65) Prior Publication Data
US 2022/0317713 A1    Oct. 6, 2022

(30) Foreign Application Priority Data
Mar. 30, 2021    (CN) .......................... 202110339692.2

(51) Int. Cl.
*G05F 1/569*    (2006.01)
*G06F 1/24*    (2006.01)
(Continued)

(52) U.S. Cl.
CPC ................ *G05F 1/569* (2013.01); *G06F 1/24* (2013.01); *G06F 1/28* (2013.01); *G06F 1/30* (2013.01)

(58) Field of Classification Search
CPC ... G06F 1/569; G06F 1/24; G06F 1/28; G06F 1/30
See application file for complete search history.

(56) References Cited

U.S. PATENT DOCUMENTS

2005/0289373 A1*    12/2005    Chapuis ................... H02J 1/08
                                                                 713/300
2015/0039913 A1    2/2015    Sugiyama et al.
(Continued)

FOREIGN PATENT DOCUMENTS

CN    103904715 A    7/2014
CN    103518310 B    5/2017
(Continued)

OTHER PUBLICATIONS

Renesas, ISL81802, 80V Dual Synchronous Buck Controller, R16DS0033EU0101 Rev.1.01, Oct. 15, 2020.
(Continued)

*Primary Examiner* — Mark A Connolly
(74) *Attorney, Agent, or Firm* — KIRTON McCONKIE; Evan R. Witt

(57) ABSTRACT

A power supply system includes an output terminal, a power supply control chip, a power supply switch and a detection device. The power supply control chip is configured to adjust the amount of an input power providing to an electronic device by the power supply device. The power supply switch is configured to control the connection between the power supply device and the power supply control chip. The detection device is configured to detect whether the power supply control chip operates normally. When the power supply control chip operates abnormally, the detection device controls the connection between the power supply device and the power supply control chip through the power supply switch for restarting the power supply control chip. The power supply control chip, the power supply switch and the detection device are disposed in an enclosed space.

11 Claims, 4 Drawing Sheets

(51) Int. Cl.
    *G06F 1/28*        (2006.01)
    *G06F 1/30*        (2006.01)

(56) References Cited

U.S. PATENT DOCUMENTS

| | | |
|---|---|---|
| 2015/0254911 A1 | 9/2015 | Kimura |
| 2015/0318719 A1 | 11/2015 | Kuo |
| 2017/0124011 A1 | 5/2017 | Verdino et al. |

FOREIGN PATENT DOCUMENTS

| | | | |
|---|---|---|---|
| CN | 108363450 A | 8/2018 | |
| CN | 110119177 B | 8/2020 | |
| EP | 2184663 A2 * | 5/2010 | ............ G06F 1/266 |
| TW | 201543783 A | 11/2015 | |
| TW | I536705 B | 6/2016 | |
| TW | M534844 U | 1/2017 | |
| TW | 201733239 A | 9/2017 | |
| TW | I644193 B | 12/2018 | |
| TW | 201913401 A | 4/2019 | |
| TW | 201918897 A | 5/2019 | |
| TW | M595927 U | 5/2020 | |
| WO | 2016197984 A1 | 12/2016 | |

OTHER PUBLICATIONS

Texas Instruments, TPS54J060 4-VIN to 16-VIN, 6-A, Synchronous Step-Down Converter with D-CAP3™ Control and 0.9-V Reference, SLVSES4C, Sep. 2019—Revised Jun. 2021.

\* cited by examiner

POWER SUPPLY SYSTEM AND METHOD

CROSS-REFERENCE TO RELATED APPLICATION

This application claims priority to China Patent Application No. 202110339692.2, filed on Mar. 30, 2021, the entire contents of which are incorporated herein by reference for all purposes.

FIELD OF THE INVENTION

The present disclosure relates to a power supply system and method, and more particularly to a power supply system and method utilizing a detection device to control a power supply switch, thereby controlling the connection between the power supply device and the power supply control chip.

BACKGROUND OF THE INVENTION

In order to meet the power supply needs of a large number of electronic products, the USB socket with power supply function is placed within the reach of life, such as on the wall or on the center console of the car. Therefore, the users can charge mobile phones, tablets or other electronic products with compatible specifications at any time.

The prior USB chips with power supply function are susceptible to noise interference such as static electricity. When the USB chip is interfered, the internal firmware of the USB chip would be abnormal, and the power supply would be interrupted or unable to reach the ideal speed. Under this circumstance, the power source that supplies the USB chip needs to be turned off and then re-conducted, so that the power supply is restored and the USB chip is restarted. However, in a USB socket, the side of receiving power is often located in an enclosed space. For example, the side of receiving power of the USB socket on the wall is located inside the wall, or the side of receiving power of the USB socket on the car is located inside the car shell. Further, the USB chip receives the power from the supply mains or the battery in the car. Therefore, when the USB chip operates abnormally, the power source powering the USB chip cannot be manually turned off because of being located in the enclosed space (e.g., the supply mains or the battery in the car). Thus, the USB chip cannot be restarted to restore normal power supply.

Therefore, there is a need of providing a power supply system and method to obviate the drawbacks encountered from the prior arts.

SUMMARY OF THE INVENTION

It is an object of the present disclosure to provide a power supply system and method, the detection device of which regularly detects whether the power supply control chip operates normally. When the power supply control chip operates abnormally, the power supply switch controls the connection between the power supply device and the power supply control chip so that the power supply control chip is restarted and resumes normal supply of input power to the electronic device. The power supply system and method of the present disclosure utilizes the detection device to control the power supply switch to be turned on or off, so as to control the connection between the power supply device and the power supply control chip. Therefore, the present disclosure overcomes the shortcomings in the prior art that the power supply to the power supply control chip cannot be manually turned off and the power supply control chip cannot be restarted.

In accordance with an aspect of the present disclosure, there is provided a power supply system. The power supply system includes an output terminal, a power supply control chip, a power supply switch and a detection device. The output terminal has a power supplying side and a power receiving side, and the power supplying side is configured to provide an input power to an electronic device at the power receiving side. The power supply control chip is connected between the power supply device and the electronic device and is configured to adjust the amount of the input power provided to the electronic device by the power supply device. The power supply switch is connected between the power supply device and the power supply control chip and is configured to control the connection between the power supply device and the power supply control chip. The detection device is connected between the power supply control chip and the power supply switch and is configured to detect whether the power supply control chip operates normally. When the power supply control chip operates abnormally, the detection device controls the connection between the power supply device and the power supply control chip through the power supply switch for restarting the power supply control chip. The power supply control chip, the power supply switch and the detection device are disposed at the power supplying side, and the power supplying side is disposed in an enclosed space.

In accordance with an aspect of the present disclosure, there is provided a power supply method. The power supply method including steps of: (a) providing a power supply control chip, a power supply switch and a detection device, wherein the power supply control chip, the power supply switch and the detection device are disposed in an enclosed space; (b) supplying power to the power supply control chip and the electronic device disposed outside the enclosed space by the power supply device; (c) detecting whether the power supply control chip operates normally by the detection device, performing a step (d) if the detection result is negative, and performing the step (c) again if the detection result is positive; (d) controlling the connection between the power supply device and the power supply control chip by the power supply switch; and (e) restarting the power supply control chip.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
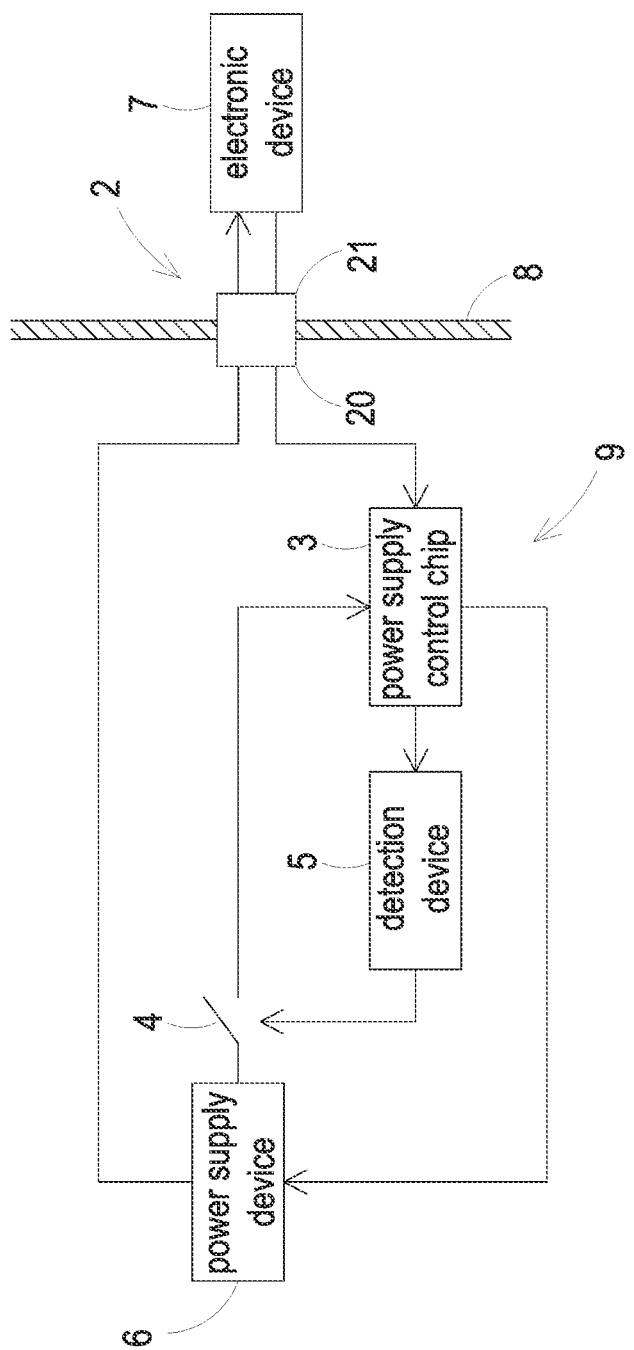
FIG. 1 is a schematic circuit diagram illustrating a power supply system according to an embodiment of the present disclosure.

FIG. 1 is a schematic circuit diagram illustrating a power supply system according to an embodiment of the present disclosure. As shown in FIG. 1, the power supply system 1 includes an output terminal 2, a power supply control chip 3, a power supply switch 4 and a detection device 5. The output terminal 2 has a power supplying side 20 and a power receiving side 21, and the power supplying side 20 is opposite to the power receiving side 21. The power supplying side 20 is configured to provide an input power to an electronic device 7 at the power receiving side 21. Specifically, the power supplying side 20 receives the input power and outputs the input power to the power receiving side 21, and the electronic device 7 at the power receiving side 21 operates normally due to receiving the input power. In an embodiment, the power receiving side 21 has connector(s) like USB Type-A, USB Type-B, USB Type-C or other USB-supported connectors, but not exclusively, to correspond to the various possible connection interfaces of the electronic device 7. The power supply control chip 3 is connected between the power supply device 6 and the electronic device 7. The power supply control chip 3 is powered by the power supply device 6 and is configured to adjust the amount of the input power provided to the electronic device 7 by the power supply device 6. Specifically, the power supply control chip 3 adjusts the power supply device 6 to provide the input power according to the input power actually required by the electronic device 7. In an embodiment, the power supply device 6 is capable of converting AC power into DC power, but not limited thereto. The power supply switch 4 is connected between the power supply device 6 and the power supply control chip 3 and is configured to control the connection between the power supply device 6 and the power supply control chip 3.

The detection device 5 is connected between the power supply control chip 3 and the power supply switch 4 and is configured to detect whether the power supply control chip 3 operates normally. When the power supply control chip 3 operates abnormally, the detection device 5 controls the connection between the power supply device 6 and the power supply control chip 3 through the power supply switch 4 for restarting the power supply control chip 3. In an embodiment, when the detection device 5 detects that the power supply control chip 3 operates abnormally, the detection device 5 controls the power supply switch 4 to be in an off state so as to disconnect the connection between the power supply device 6 and the power supply control chip 3. Accordingly, the power supply device 6 cannot supply power to the power supply control chip 3, and the power supply control chip 3 stops operating. After a waiting time, the detection device 5 controls the power supply switch 4 to be in an on state so as to reconnect the power supply device 6 to the power supply control chip 3. Accordingly, the power supply device 6 supplies power to the power supply control chip 3, and the power supply control chip 3 is restarted. The length of the waiting time is 1 second in some embodiments but not limited thereto, the length of the waiting time can be adjusted according to actual needs. The power supply control chip 3, the power supply switch 4 and the detection device 5 are disposed at the power supplying side 20, and the power supplying side 20 is disposed in an enclosed space 9.

Figure 2:
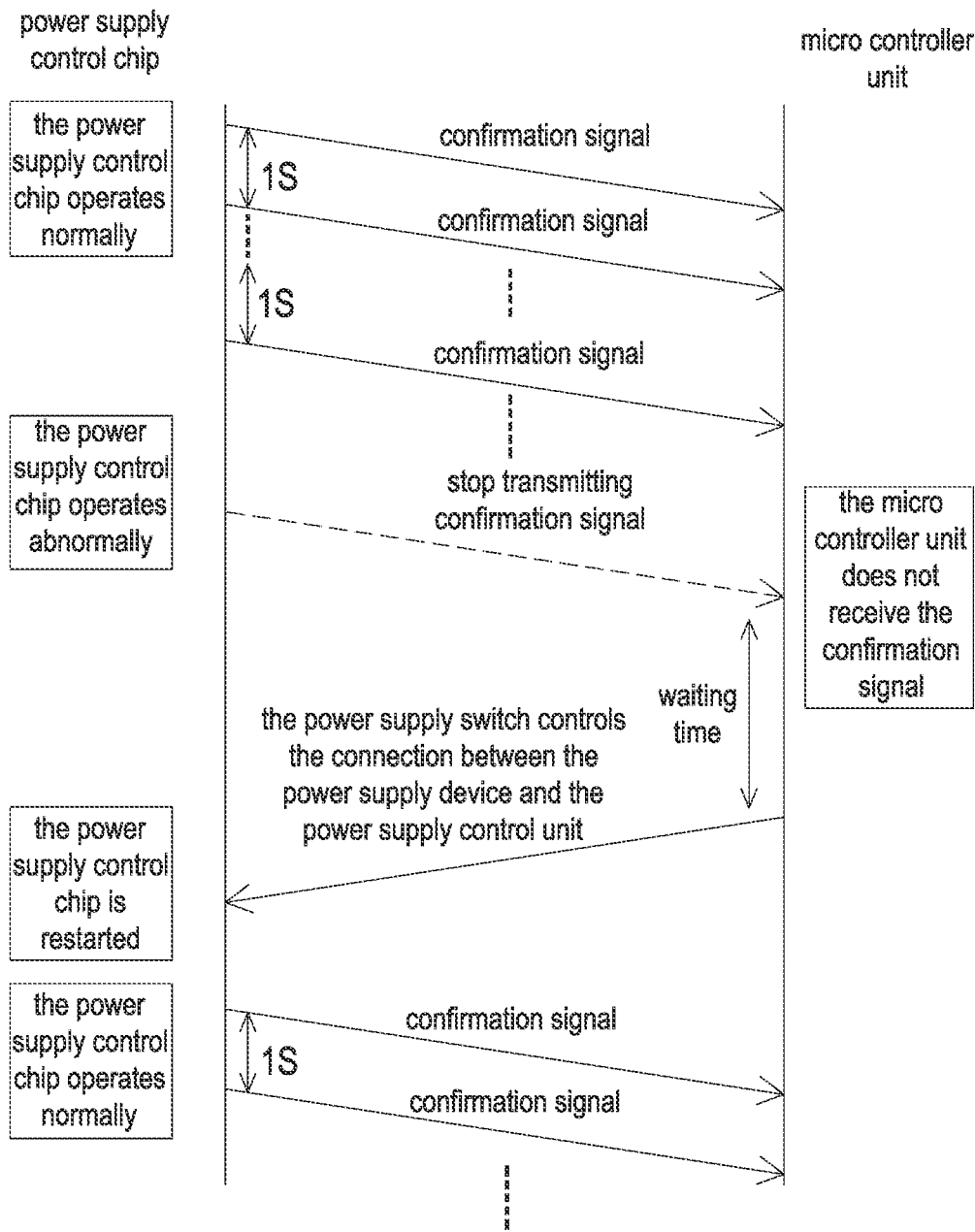
FIG. 2 is a schematic diagram illustrating the signal transmission between the power supply control chip and the micro controller unit according to another embodiment of the present disclosure.

In an embodiment, the output terminal 2 is disposed on the wall 8, the power supplying side 20 and the power receiving side 21 are located at two sides of the wall 8 respectively, and the enclosed space 9 is located at the side of the wall 8 where the socket receives the power (i.e., at the same side as the power supply device 6). The power supply system 1 of the present disclosure utilizes the detection device 5 to control the power supply switch 4 to be turned off or on, so as to control the connection between the power supply device 6 and the power supply control chip 3. Therefore, the present disclosure overcomes the shortcomings in the prior art that the power supply to the power supply control chip cannot be manually turned off and the power supply control chip cannot be restarted In an embodiment, the detection device 5 is for example but not limited to micro controller unit, micro processor or detection circuit. For example, the detection device 5 is a micro controller unit, and how the micro controller unit detects whether the power supply control chip 3 operates normally and restarts the power supply control chip 3 when the operation is abnormal is exemplified as follows. As shown in FIG. 2, when the power supply control chip 3 operates normally, the power supply control chip 3 sends a confirmation signal to the micro controller unit regularly, and the period of sending the confirmation signal is for example but not limited to 1 second. When the power supply control chip 3 operates abnormally, the power supply control chip 3 stops sending the confirmation signal to the micro controller unit. If the micro controller unit does not receive the confirmation signal within a waiting time, the micro controller unit controls the power supply switch 4 to control the connection between the power supply device 6 and the power supply control chip 3. Thereby, the power supply control chip 3 is restarted, and the power supply control chip 3 thus resumes normal operation. The length of the waiting time is 1 second in some embodiments but not limited thereto, the length of the waiting time can be adjusted according to actual needs.

Figure 3:
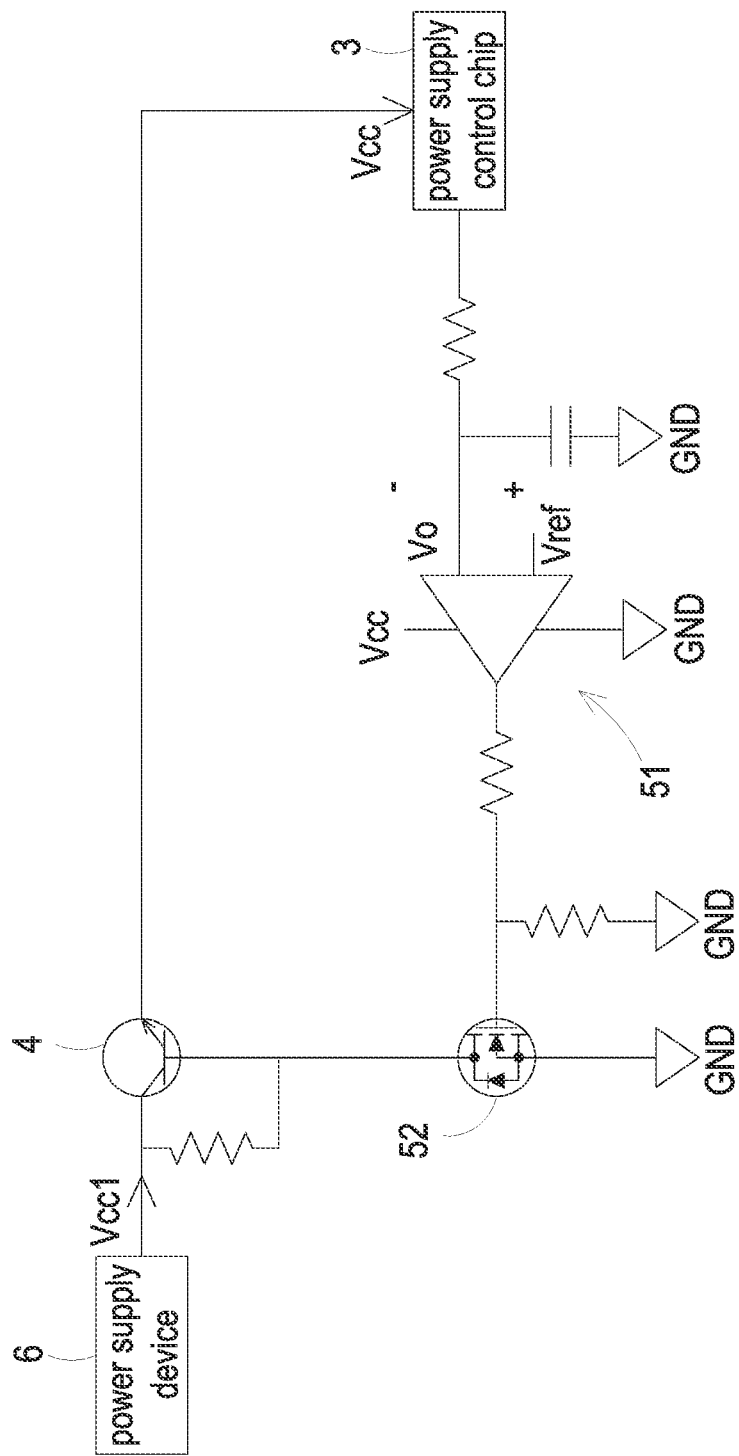
FIG. 3 is a schematic circuit diagram illustrating the detecting circuit according to another embodiment of the present disclosure.

The implementation of the detection device 5 being a detection circuit 50 is exemplified as follow. As shown in FIG. 3, the detection circuit 50 includes a comparator 51 and a switch 52. The power supply device 6 provides a power supply voltage Vcc to the power supply control chip 3. The detection circuit 50 utilizes the comparator 51 to compare the working voltage Vo of the power supply control chip 3 with the reference voltage Vref. When the working voltage Vo of the power supply control chip 3 is greater than the reference voltage Vref, it means that the power supply control chip 3 operates normally. Under this circumstance, the switch 52 is turned off, the power supply switch 4 is turned on, and the power supply device 6 keeps supplying power to the power supply control chip 3. When the working voltage Vo of the power supply control chip 3 is less than the reference voltage Vref, it means that the power supply control chip 3 operates abnormally. Under this circumstance, the switch 52 is turned on, the power supply switch 4 is turned off, the power supply device 6 cannot supply power to the power supply control chip 3, and thus the power supply control chip 3 stops operation. After a waiting time, the switch 52 is turned off and the power supply switch 4 is turned on to reconnect the power supply device 6 to the power supply control chip 3. Accordingly, the power supply device 6 supplies power to the power supply control chip 3, and the power supply control chip 3 is restarted. The detection circuit 50 in this embodiment utilizes the comparator 51 to compare the working voltage Vo of the power supply control chip 3 with the reference voltage Vref, thereby determining whether the power supply control chip 3 operates normally. In an embodiment, the reference voltage Vref is for example not limited to 2.5V, and the value of the reference voltage Vref can be adjusted according to the power supply speed requirements or the protocol specifications of the power supply control chip.

In an embodiment, the power supply control chip 3 is a power supply control chip with a fast power supply function, and the fast charge protocol supported by the power supply control chip is for example but not limited to the Power Delivery protocol (PD), the Quick Charge protocol (QC), etc.

Figure 4:
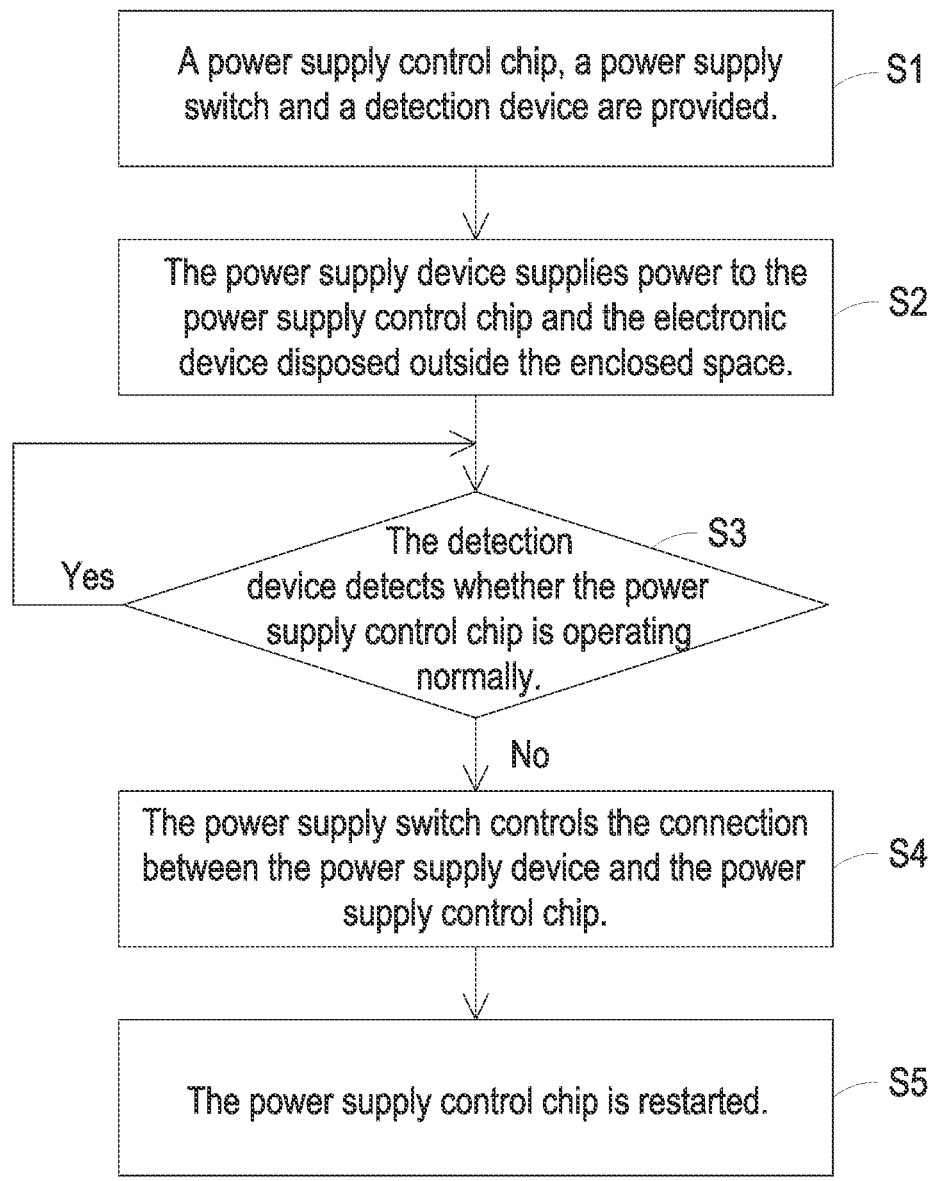
FIG. 4 is a flow chart illustrating a power supply method according to an embodiment of the present disclosure.

FIG. 4 is a flow chart illustrating a power supply method according to an embodiment of the present disclosure. The power supply method of the present disclosure is applicable for the power supply system 1 stated above. As shown in FIG. 4, the power supply method includes steps S1, S2, S3, S4 and S5. In step S1, a power supply control chip 3, a power supply switch 4 and a detection device 5 are provided. The power supply control chip 3, the power supply switch 4 and the detection device 5 are disposed at a power supplying side 20, and the power supplying side 20 is disposed in an enclosed space 9. In step S2, the power supply device 6 supplies power to the power supply control chip 3 and the electronic device 7 disposed outside the enclosed space 9. In step S3, the detection device detects whether the power supply control chip 3 operates normally. The step S4 is performed if the detection result is negative, and the step S3 is performed again if the detection result is positive. In step S4, the power supply switch 4 controls the connection between the power supply device 6 and the power supply control chip 3. In step S5, the power supply control chip 3 is restarted.

In an embodiment, in step S3, the detection device 5 is a micro controller unit. When the power supply control chip 3 operates normally, the power supply control chip 3 sends a confirmation signal to the micro controller unit, and step S3 is performed again. When the power supply control chip operates abnormally, the power supply control chip 3 stops sending the confirmation signal to the micro controller unit. If the micro controller unit does not receive the confirmation signal within a waiting time, step S4 is performed.

In an embodiment, in step S3, the detection device 5 is a detection circuit 50. When the working voltage Vo of the power supply control chip 3 is greater than the reference voltage Vref, step S3 is performed again. When the working voltage Vo of the power supply control chip 3 is less than the reference voltage Vref, step S4 is performed.

From the above descriptions, the present disclosure provides a power supply device and method, the detection device of which regularly detects whether the power supply control chip operates normally. When the power supply control chip operates abnormally, the power supply switch controls the connection between the power supply device and the power supply control chip so that the power supply control chip is restarted and resumes normal supply of input power to the electronic device. The power supply system and method of the present disclosure utilizes the detection device to control the power supply switch to be turned on or off, so as to control the connection between the power supply device and the power supply control chip. Therefore, the present disclosure overcomes the shortcomings in the prior art that the power supply to the power supply control chip cannot be manually turned off and the power supply control chip cannot be restarted.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power supply system, comprising:
an output terminal having a power supplying side and a power receiving side, the power supplying side configured to provide an input power to an electronic device at the power receiving side;
a power supply control chip connected between a power supply device and the electronic device and configured to adjust an amount of the input power provided to the electronic device by the power supply device;
a power supply switch connected between the power supply device and the power supply control chip and configured to control the connection between the power supply device and the power supply control chip; and
a detection device connected between the power supply control chip and the power supply switch and configured to detect whether the power supply control chip operates normally, wherein when the power supply control chip operates abnormally, the detection device controls the connection between the power supply device and the power supply control chip through the power supply switch for restarting the power supply control chip;
wherein the power supply control chip, the power supply switch and the detection device are disposed in an enclosed space.

2. The power supply system according to claim 1, wherein when the detection device detects that the power supply control chip operates abnormally, the detection device controls the power supply switch to be in an off state so as to disconnect the connection between the power supply device and the power supply control chip, the power supply device cannot supply power to the power supply control chip, and after a waiting time, the detection device controls the power supply switch to be in an on state so that the power supply device supplies power to the power supply control chip, and the power supply control chip is restarted.

3. The power supply system according to claim 1, wherein the power supply control chip supports Power Delivery protocol or Quick Charge protocol.

4. The power supply system according to claim 1, wherein the detection device is a micro controller unit, a micro processor or a detection circuit.

5. The power supply system according to claim 4, wherein the detection device is a micro controller unit, the power supply control chip sends a confirmation signal to the micro controller unit regularly when the power supply control chip operates normally, and the power supply control chip stops sending the confirmation signal to the micro controller unit when the power supply control chip operates abnormally.

6. The power supply system according to claim 5, wherein if the micro controller unit does not receive the confirmation signal within a waiting time, the power supply switch controls the connection between the power supply device and the power supply control chip to restart the power supply control chip.

7. The power supply system according to claim 4, wherein the detection device is a detection circuit, the detection circuit compares a working voltage of the power supply control chip with a reference voltage, when the working voltage is greater than the reference voltage, the power supply device keeps supplying power to the power supply control chip, when the working voltage is less than the reference voltage, the power supply switch is turned off, the power supply device cannot supply power to the power supply control chip.

8. A power supply method, comprising steps of:
(a) providing a power supply control chip, a power supply switch and a detection device, wherein the power supply control chip, the power supply switch and the detection device are disposed in an enclosed space;
(b) supplying power to the power supply control chip and an electronic device disposed outside the enclosed space by the power supply device;
(c) detecting whether the power supply control chip operates normally by the detection device, performing a step (d) if the detection result is negative, and performing the step (c) again if the detection result is positive;
(d) controlling the connection between the power supply device and the power supply control chip by the power supply switch; and
(e) restarting the power supply control chip.

9. The power supply method according to claim 8, wherein in the step (c), the detection device is a micro controller unit, when the power supply control chip operates normally, the power supply control chip sends a confirmation signal to the micro controller unit, and the step (c) is performed again, when the power supply control chip operates abnormally, the power supply control chip stops sending the confirmation signal to the micro controller unit, and if the micro controller unit does not receive the confirmation signal within a waiting time, the step (d) is performed.

10. The power supply method according to claim 8, wherein in the step (c), the detection device is a detection circuit, when a working voltage of the power supply control chip is greater than a reference voltage, the step (c) is performed again, when the working voltage of the power supply control chip is less than the reference voltage, the step (d) is performed.

11. The power supply method according to claim 8, wherein the power supply control chip supports Power Delivery protocol or Quick Charge protocol.

* * * * *